INVENTOR.
ARVIN D. MC GREGOR
BY
Gerald R Hibnick
ATTORNEY.

INVENTOR.
ARVIN D. MC GREGOR.
BY
Gerald R Hibnick
ATTORNEY.

3,320,429
Patented May 16, 1967

3,320,429

OPTICAL READ HEAD USING LIGHT CONDUCTING ROD AND DEFINING A TRIANGULAR READ AREA

Arvin D. McGregor, Birmingham, Mich., assignor to Burroughs Corporation, Detroit, Mich., a corporation of Michigan Filed Apr. 20, 1964, Ser. No. 361,091
15 Claims. (Cl. 250—219)

This invention relates to an improved optical read head for an optical character recognition system and, more particularly, to a light transmitting medium which is partially interposed between a source of illumination and an information-bearing document to thereby select from a large illuminated portion of the document an interrogatable surface segment which is much smaller than the surface which the light transmitting medium could otherwise interrogate.

The field of electronic devices employed for the rapid recognition of document-borne characters, such as the identifying characters applied to bank checks, is presently characterized by two major types of systems, namely magnetic and optical. In both types of systems, character-bearing documents are rapidly transported past a read head which sequentially scans segments of each character. The read head produces an output waveform unique to each alpha-numeric character. Each output waveform is analyzed and compared with standards to determine the identity of the scanned character.

In magnetic character recognition, the characters are printed with a pigmented substance having magnetic properties. Just prior to scanning, the character is passed into a magnetizing field so that a magnetic transducer in the read head will produce an output waveform responsive to the quantity of the magnetic material on the character at each instant during scanning. Although magnetic character recognition has gained wide acceptance, its reliability depends greatly upon the close tolerance application of the magnetizable substance to the document and, in particular, to exacting control over the manufacture of the pigmented, magnetizable substance and its transport element which frequently is a ribbon coated with a pigmented carrier having very small particles of a magnetizable metal oxide. Because of its special properties and the required very high quality, the cost of this coated ribbon is quite high compared to typical typewriter ribbons. In contradistinction to the typical typewriter ribbon, which may be reused many times before it loses proper transfer qualities, the ribbon employed in applying magnetic characters can be used only once. Accordingly, the use of these specialized ribbons becomes an important element of economic consideration in the operation of a magnetic character recognition system.

With respect to optical character recognition systems, the printing of the characters generally follows standard techniques and obviates a specialized and expensive ribbon-like element. Heretofore, however the success of optical character recognitions has depended upon several other factors, each having associated problems. In most optical character recognition systems it has been found necessary to employ a complex array of elements to illuminate a portion of the character and to transmit light reflected from illuminated portion to transducing means which produce a characteristic output waveform. In some of these systems emphasis is placed upon defining a very small area of illumination and then transmitting all light reflected therefrom. Other systems illuminate a general area and then select for transmission only light reflected from a particularly small area therein. In both systems, specially calibrated and accurately positioned lenses, masks, light guides, and illuminating means have been employed. Not only are these elements, their fabrication, and assembly expensive, but these "read heads" require considerable space for housing.

Accordingly, it is one object of this invention to provide an optical read head having a unitary light transmitting medium, which, in combination with a unitary illuminating means, defines an interrogation area that is significantly smaller than both the illuminated area and the receptive scope of the transmitting media.

Another object of this invention is to provide a highly compact optical read head obviating light focusing and image transmitting elements.

Another object of this invention to provide in an optical read head a faceted light transmitting medium one facet of which is interposed partially between a source of illumination and a reference surface causing a portion of the reference surface adjacent another of the medium to be darkened and thereby reducing the area of the reference surface from which the other facet can receive reflected illumination.

A further object of this invention to provide an improved optical read head having a plurality of adjacent light transmitting elements each in the shape of a parallelepiped, each lying between and coupling by total reflection a respective section of a light energy transducer and a reflective reference surface, and a portion of each element being interposed between a light source and the reflective surface.

In accordance with the primary features of this invention there is provided in close relationship a source of illumination in the form of an electric lamp bulb, a light transmitting medium in the preferred form of a rectangular parallelepiped of glass, and a light energy transducing means in the form of a photovoltaic cell.

All three elements lie to one side of the face of a rapidly transported character-bearing document. Light from the source is directed toward the document and is incident upon a relatively large portion of its face. A corner of the light transmitting medium is partly interposed between the light source and the document and thus casts a sharply defined shadow upon the document dividing it into an illuminated portion and a shadowed or darkened portion. The demarcation between the shadowed and illuminated portions forms one terminus of a segment of the document which is interrogatable by a facet of the light transmitting medium lying adjacent the document. The opposite terminus of the interrogatable segment is defined by the optical angle of acceptance of the light transmitting medium in combination with the position of the corner of the medium. Light reflecting from the small interrogatable segment enters through the adjacent facet of the transmitting medium, is totally reflected therein, and is transmitted to the transducing means at the opposite end thereof.

Other objects and features of this invention will become apparent by reference to the following description taken in conjunction with the accompanying drawings in which.

Figures 1, 2, 3:
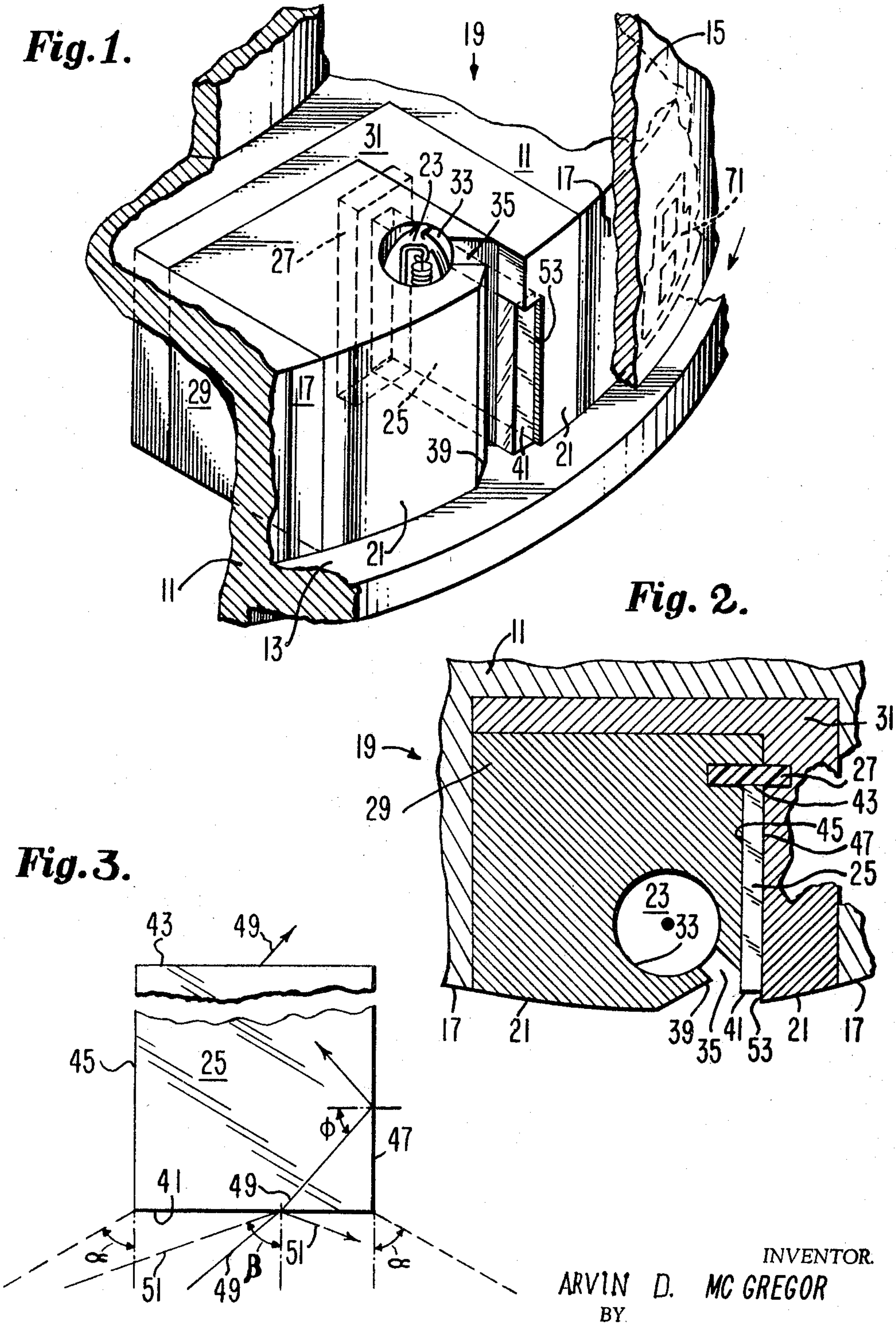
FIG. 1 is an isometric view of the subject optical read head, including a section of the supporting structure, and showing a portion of a character-bearing document prior to the interrogation position.
FIG. 2 is a partial sectional view of the optical read head as seen from a position parallel the plane of the document.
FIG. 3 is a diagrammatic illustration of the light reflecting characteristics of the light transmitting medium.

With reference to FIG. 1, there is shown a section of a stationary supporting structure 11 which may be a portion of a Record Handling and Reading Apparatus similar to that described in H. M. Frederick Patent No. 3,109,924 assigned to Burroughs Corporation. The supporting structure 11 could be mounted beneath a driven roller which is associated with a document guideway so that the document is transported in intimate relationship with a portion of the structure 11 which houses a document sensing or read head unit, as described in the Frederick patent. In such an environment, the optical read head, which is the subject of this invention, obviates the magnetizing head and the magnetic read head briefly described in the cited patent.

It is also noted that the subject optical read head easily fits into the space which previously housed the magnetic read head of the cited patent, a volume which is less than one cubic inch.

Although the supporting structure 11 is shown cylindrical to provide a change of direction in the path of the document, as in the Frederick patent, this is not to be considered a limiting configuration.

Extending from the periphery of the supporting structure 11 is a ledge 13 which defines the bottom of the guideway for a rapidly transported document 15. By guideway means, not shown, but which may be similar to those shown in the Frederick patent, the moving document is held in surface contact with the peripheral face 17 of the supporting structure 11. The optical read head 19 is mounted within the supporting structure and has a document contact surface 21 flush with the peripheral face 17. The optical read head 19 comprises a source of illumination 23, a light transmitting medium 25, and a light energy transducing means 27. These three elements are mounted into the body portions 29 and 31 of the read head secured within the supporting housing 11 by conventional means which insure the relative position of the elements.

As shown in FIGS. 1 and 2, the cube-like body portion 29 has a cylindrical cavity 33 for receiving the light source 23 which is shown as a lamp. The light source 23 may be chosen from any types commercially available; preferably having an elongated or tubular envelope and a filament positioned lengthwise therein so as to emit a line of light. A light channel 35 in the body portion 29 extends from the cavity 33 out toward the document contact surface 21. Proximate to the point of convergence of one side of the light channel 35 with the document contact surface, the surface 21 is canted inward so that there is formed a lip 39 which is positioned out of the path of the leading edge of a rapidly approaching document 15. The other side of the light channel terminates against the light transmitting medium 25 slightly above its lower edge or facet 41. With the exception of this latter relationship, which will be discussed in more detail subsequently, the dimensions and configuration of the light channel 35 are immaterial to the operation of the read head as long as some light can pass from the source 23 and impinge directly upon the document as it travels past the lower facet 41.

Part of the interfaces of the body portions 29 and 31 of the read head provide a pair of contiguous pockets or recesses into which are respectively seated the light energy transducing means 27 and the light transmitting medium 25.

The light energy transducing means 27 may be chosen from any one of the well known types of photoelectric cells such as a photovoltaic cell, which is responsive to the intensity of light energy impinging upon its surface independent of the pattern, if any, that the impinging light forms on the surface of the cell. As the quantum light energy striking its surface varies, the electrical energy transduced by the photocell also varies proportionately and produces an electronic waveform which can be differentiated, amplified, analyzed and compared, either in an analog or a digital manner, in very much the same mode as the output from a magnetic read head. In fact, it has been found that after electrically differentiating the output, to remove any existing D.C. level which may vary due to different types of documents and other factors, the resulting signal waveform for any particular alphanumeric character is the same as its counterpart magnetc character when interrogated and transduced by a magnetic read head. Accordingly, the same waveform analyzing and comparing system can be employed in conjunction with the subject optical read head as was employed with the magnetic read head it replaces.

As shown in FIG. 2 the photoelectric cell 27 is oriented adjacent to the upper facet 43 of the light transmitting medium 25. In order to receive maximum energization by the light emanating from the facet 43, the cell should at least cover the surface area of the facet. It is of course to be understood that the only variable light energy allowed to materially affect the output of the cell is to be from light transmitted by the medium 25. A small continuous level of light energy would not be adverse since the relative shape, rather than absolute points, of the output waveform is to be analyzed.

Preferably, the photocell is enclosed by the body portions 29 and 31 so that the only light energy it receives is from "window" formed by the upper facet 43 of the transmitting medium.

The essence of this optical read head is the use of a simple light transmitting medium, the operation of which depends upon the total reflection of light being transmitted from one end thereof to the other, and the corresponding rejection of all other environmental light.

Basic optical physics relating to the phenomenon of total reflection will be briefly reviewed with reference to FIG. 3. A more complete understanding of total reflection can be obtained from a discussion of Snell's law in such a textbook as Physics by Housmann and Slack, second edition, 1939. FIG. 3 shows a greatly magnified view of a portion of a light transmitting medium such as, for example, a piece of glass 25 having bottom and top facets 41 and 43 and side facets 45 and 47. For a ray of light 49 to be totally reflected within the glass plate 25 and, by repeated such reflections be transmitted from one facet 41 to an opposite facet 43, the ray of light must be incident upon the internal side of the facet 47 or 45 at an angle equal to or greater than the critical angle of reflection $\phi$. According to Snell's law, when light passes from one medium into another the product of the sin of the angle of incident and the index of refraction of the first medium equals the product of the sin of the angle of refraction and the index of refraction of the second medium:

$$m \sin i = n \sin r \tag{1}$$

Since the facets 41 and 47 are at right angles, and the index of refraction of air is unity, the critical angle of reflection $\phi$ can be developed from Snell's law as:

$$\sin \alpha = n \cos \phi \tag{2}$$

in which $n$ is the index of refraction of the glass plate. For a ray of light to strike the internal side of the facet 47 at an angle equal to or greater than the critical angle $\phi$, it must enter the transmitting medium via the facet 41 or 43 at an angle equal to or less than the angle of acceptance $\alpha$. By further development of the above formulas, the acceptance angle $\alpha$ can be defined as:

$$\sin \alpha = \sqrt{m^2 - n^2} \tag{3}$$

In which $m$ is the index of refraction of the environment surrounding the transmitting medium. For particular media, such as glass and air, the indexes of refraction are fixed, and accordingly, the angle of acceptance and the critical angle of reflection are also fixed.

From the above, it can be shown that if light, as represented by the ray 51, were incident upon the transmitting medium 25 by an angle $\beta$, which is greater than the acceptance angle $\alpha$, then this light incident upon the facet 41 would be totally reflected away therefrom. Accordingly, light incident upon a surface of a transmitting medium, such as that shown in FIG. 3, will either be received into the medium and be totally reflected internally and subsequently be transmitted out of an opposite surface thereof, or the light will be totally reflected externally, i.e., rejected and will not enter the transmitting medium. It is important to note that, because of the above described optical phenomena, light incident upon the exterior of either of the side facets 45 and 47, if it is accepted into the transmitting medium 25, cannot exit from either the top or bottom facets 41 and 43, but must exit from the opposite side facet, 47 or 45 respectively.

In its preferred form, the light transmitting medium 25 employed in the subject optical read head is a small rectangular parallelepiped of glass. Although the medium is not strictly limited to the preferred material and shape, it will be appreciated that a small plate of glass has the advantages of structural uniformity in the low price range, ease of handling, and also enables the formation of a rectangular area of interrogation. The latter will be elaborated upon hereinafter. It is also to be noted that the transmitting medium need not be of a distinctive type of glass or similar substantially transparent material nor be uniquely treated or coated. A small plate of glass, such as a piece of a slide used in mounting specimens for examination under a microscope has proved adequate for the successful operation of the subject optical read head. Typical dimensions of such an element for reading the print font generally used on bank checks could be: thickness, fifty milli-inches; height, without accommodation for misregistration of the character, one-hundred and twenty milli-inches, the approximate height of a character; length, one-half inch.

As previously described and as shown in FIGS. 1 and 2, the transmitting medium is substantially encased within the read head body portions 29 and 31 with its top facet 43 positioned proximate to the transducing cell 27. The side facets 45 and 47 lie respectively adjacent the body portions 29 and 31 with the exception of the lower section of the facet 45 which is interposed into a portion of the light channel 35. The bottom facet or edge 41 lies exposed and faces the path of the document 15 as it is rapidly transported along the surfaces 17 and 21.

Figures 4, 5, 6:
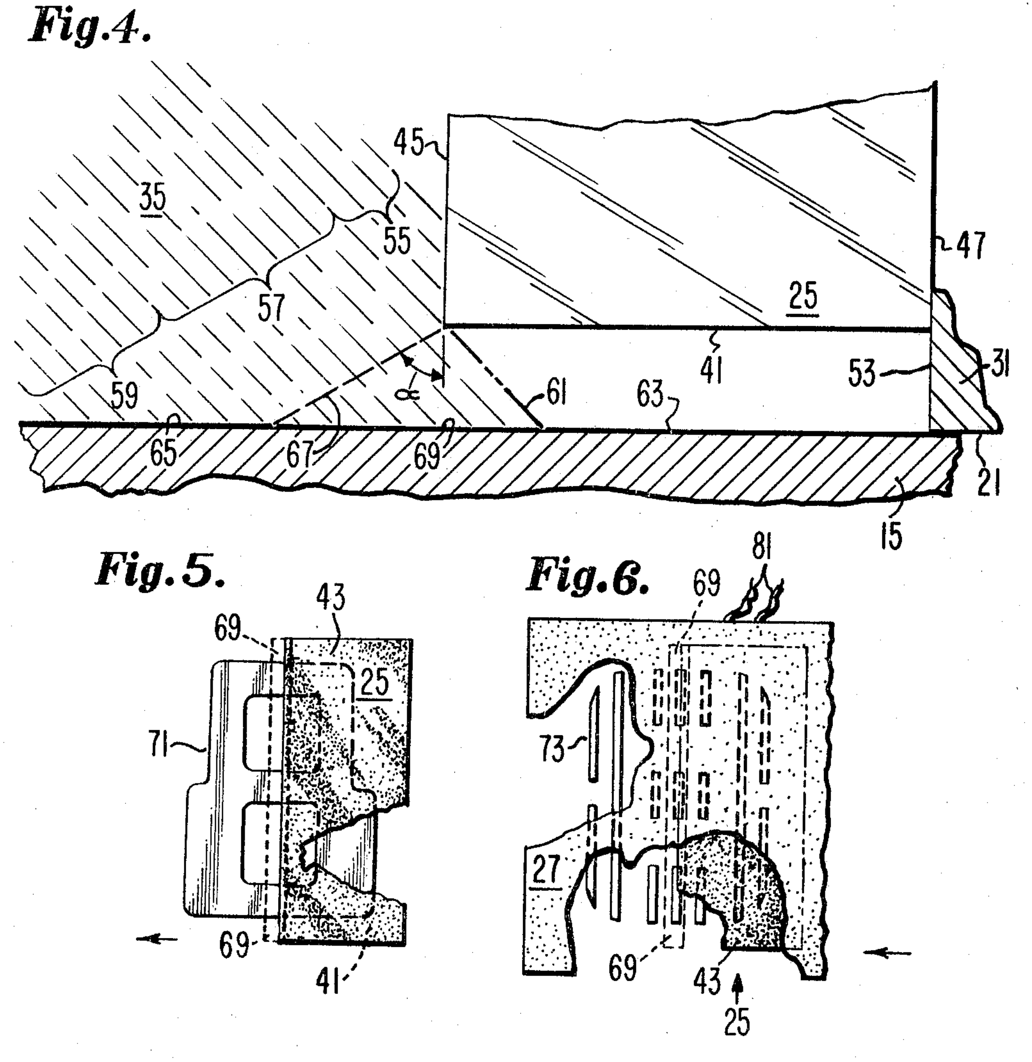
FIG. 4 is a greatly magnified sectional view of a portion of the combination shown in FIG. 2 with the addition of diagrammatic references for defining the interrogatable segment.
FIGS. 5 and 6 are elevational views, broken in part, demonstrating the interrogation of a segment of a character as seen respectively at the top of the transmitting medium, and by the light energy transducer.

With reference to FIG. 4, which is a greatly magnified view of the lower portion of the transmitting medium 25, it will be seen that the bottom facet 41 is slightly inset from the document contact surface 21 by an amount equal to the segment 53 of the body portion 31. Since the document is transported in continuous contact with the surfaces 17 and 21, the face of the document will be maintained in a fixed spacial relationship with the facet 41, essentially as shown in FIG. 4.

For ease of description, the light emanating from the source 23 and passing through the light channel 35 is diagrammatically divided into three groups of light rays: 55, 57, and 59. Because of the magnification of FIG. 4 and for ease of showing, the light rays are drawn parallel to one another. The light rays 55 will be incident upon the interposed portion of the side facet 45 and, as previously discussed, either will be rejected or will be transmitted toward the opposite side facet 47, but will not enter through the side facet 45 and then exit from the lower facet 41. Accordingly, there will be formed a shadow-line 61 such that the document surface portion 63 rearward of the shadow-line, to the right as seen in FIG. 4, will not receive direct illumination and essentially will lie in the dark.

The groups 57 and 59 light rays will freely fall upon the document in advance of the darkened portion 63 and will be reflected upward at various angles depending upon minute irregularities in the surface of the document and characters carried thereon; however, most light will tend to follow the basic rule that the angle of incidence will equal the angle of reflection. For this reason, most of the light rays in group 59, after reflecting from the document will impinge upon the side facet 45 and, therefore, will act in the same manner as those in group 55. The small quantity of light rays of group 59 which, after reflection upon the document, impinge upon the bottom facet 41 of the transmitting media will be following a linear path which is at an angle greater than the acceptance angle $\alpha$ and, as described above with respect to the light ray 51 and the angle $\beta$, will not be able to enter into the transmitting medium. That these rays of group 59 approach at an angle greater than $\alpha$ is obvious from the fact that they reflect from the document surface portion 65 which is in advance of the line 67 which lies at the angle $\alpha$ from the apex formed by the intersection of the facets 41 and 45. Although these rejected rays will reflect back down upon the document beneath the facet 41 and then again up toward that facet, the majority of them will again be incident at an angle greater than the acceptance angle $\alpha$. Even though light reflected from the document 15 is a variable indicative of printed matter or other surface markings thereon, the very small amount of light reflected from the surface portion 65 which is eventually received into the transmitting medium 25 via its lower facet 41 will be so insignificant that the satisfactory operation of the read head will be unaffected.

The light rays of group 57 will fall upon the document's interrogatable surface 69 which is defined between the shadow-line 61 and the acceptance angle line 67. All light which reflects from the interrogatable surface 69 and is incident to the bottom edge 41 within the acceptance angle $\alpha$ will be totally reflected within the transmitting media and, as previously discussed, will leave through the top facet 43 as a substantially diffused quantum of light energy.

As shown in FIG. 4, there is formed, in two dimensional terms, an interrogation triangle whose base is the width of the interrogatable surface area 69. One side of the triangle and its associated angle is defined by the acceptance angle $\alpha$ and its associated angle line 67 which forms one terminus of the interrogatable area. The other side of the triangle and the opposite terminus of the interrogatable area are defined by the shadow-line 61 whose angle is dependent upon the position of the light source 23 with reference to the corner formed by the facets 41 and 45. The altitude of the triangle is defined by the distance the lower edge 41 is inset from the document contact surface 21, i.e., the height of the body segment 53. Therefore, a change of one or more of these parameters will cause a change in the size of the triangle whose base forms the width of the surface area 69. Since the transmitting medium 25, is preferably in the form of a rectangular parallelepiped, and since the light channel 35 traverses the length of the medium and guides a bar of light from the source 23, the interrogation triangle has the three dimensioned form of a prism whose rectangular base defines the surface area 69.

From the above, it will now be appreciated that the light source 23 illuminates surface portions 65 and 69 of the document and that position of the terminus of the portion 69 beneath the facet 41 depends upon the position of the light source, the perpendicular distance 53 between the document face and the facet 41, and the position of the interposed corner formed by the facets 41 and 45. Also, the document surface portions 69 and 63 lie within the angle of acceptance of the facet 41 such that the position of the terminus of the portion 69 beyond the facet 41 is dependent upon the index of refraction of the transmitting medium 25, the distance 53 between the facet 41 and the document face, and the corner formed by the facets 41 and 45. Since the illuminated surface and the acceptable surface are coincident in the rectangular surface area 69, and since the areas 63 and 65 are lacking respectively illumination and acceptability, the area 69 is the only surface of the document 15 that can be interrogated by the facet 41. Since the distance between termini of the area 69 can be regulated by control of the parameters as above noted, there can be obtained as narrow a "scanning slit" as might be desired. It will further be appreciated that the control of the width of the interrogatable surface area 69 has been accomplished without the use of lenses and the other equipment common to most optical character recognition systems which heretofore have prevented the realization of a truly compact and economic optical read head.

An increased understanding of the novel combination of elements in the subject optical read head will be obtained by reference to FIGS. 5 and 6. In FIG. 5, which is a conceptual view from above the top facet 43 of the transmitting medium 25, there is shown a character 71 a portion of which lies within the interrogatable area 69, which is the surface enclosed within the closely spaced dashed lines. The character 71 is shown, for example, in the form of the number eight in the E–13B font, which is widely used for magnetic character recognition in the United States and many other countries. As previously explained, the light reflected into the facet 41, which lies adjacent the character 71, will be, for all practical purposes, exclusively from the interrogatable surface area 69 which is a definably small portion of the entire character. The quantum of light entering the facet 41 is variable depending upon the amount of the surface 69 that is covered by the character and is independent of the configuration that the character portion forms in the interrogatable area 69. In this respect, this optical read head is similar to magnetic read heads and is distinguished from most optical read heads which recognize character size and shape.

By operation of the phenomenon of total reflection, the light entering the facet 41 will leave the opposite facet 43 as a quantum of light energy whose intensity is proportional to the light reflected from the surface 69. The surface of the facet 43 is shown to be substantially uniformly grey to emphasize the fact that the job of the transmitting medium 25 is to transmit relative amounts of light and not to cause an image transfer. Accordingly, as the document-borne character 71 is rapidly transported beneath the facet 41, the character portion within the interrogatable surface area 69 will be progressively changing until the entire character is scanned. During the scanning period, there will be emitted from the facet 43 variable quantums of light indicative of the relative reflectiveness of the character 71 and hence indicative of the character itself.

FIG. 6 illustrates a conceptual view from above the photoelectric cell 27 in which, for example, the character 73 is shown as a number eight in the CMC 7 font employed widely in European character recognition systems. As above described, the read head interrogates the surface area 69 as the document-borne characters are transported adjacent its facet 41 such that an entire character is interrogated in a brief time interval. The read head progressively receives illumination reflected from the character surface, the quantum of which is indicative of the identity of the character, and transmits it to its light energy transducer 27 which produces as an output an electrical waveform. At any instance, the relative amplitude of the output is proportional to the total energization of the transducer. Accordingly, the operation of the subject optical read head is based on a quantum transmission of light and is not concerned with an image recognition and transmission. To emphasize this quantum relationship, the surface of the transducing cell 27 is shown substantially uniformly shaded.

Figure 7:
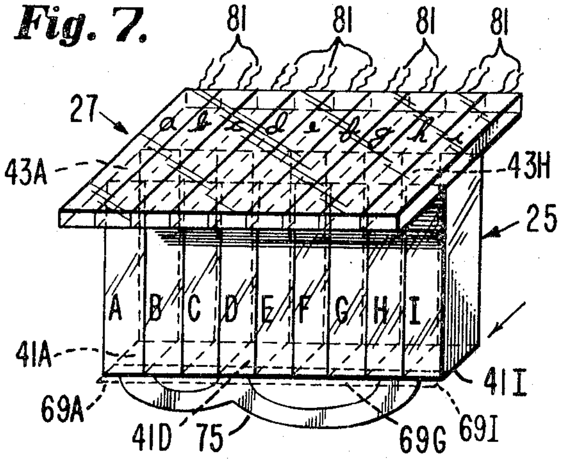
FIG. 7 is a perspective view of the transmitting medium and associated transducer portions of a second embodiment of this invention.

FIG. 7 shows another embodiment of this invention which is especially directed to the recognition of generally used print fonts as distinguished from most character recognition read heads which can operate upon only a uniquely configurated font such as shown in FIGS. 5 and 6. Heretofore, a major reason for restriction to a particularly unique font is the practical limitation to the size and shape of the interrogatable area 69. If the interrogatable area could be as narrow as desired and could also be broken into a plurality of small adjacent segments, each segment associated with a light transmitting and a light energy transducing element, then the resulting plurality of waveforms, one from each transducer as the entire character is scanned, could be analyzed and would be indicative of the scanned character with far greater accuracy than one waveform. Because of the increased accuracy of this type of read head, specialized fonts could be obviated.

As shown in FIG. 7, the light transmitting medium 25 is in the form of a plurality of abutting rectangular parallelepipeds A–I, the array of which traverse one dimension of the character 75, which may be in the form of the number eight of typical a typewriter font. The light energy transducing means 27 is similarly formed of a plurality of sections *a–i* each having its own electrical output connections 81 and each section is optically coupled to one of the parallelepipeds A–I. The theory and operation of this embodiment read head are the same as above described. The single light source 23 cooperates with each segment A–I of the interposed light transmitting media 25 to define the termini of each of interrogatable surface areas 69 A–I so that the light which reflects therefrom and enters each of the facets 41 A–I will be totally reflected and then transmitted out from the facets 43 A–I and respectfully energize the transducer sections 27 *a–i*. However, since at any instant there now is a plurality of discretely interrogatable surface areas each associated with only its transmitting media and its transducer, there will be produced a plurality of identifying waveforms for each character.

The operation of the above described embodiments of this invention should by now be obvious, especially to those skilled in the art, without a further detailed recitation thereof.

From the foregoing it will be seen that simple, efficient, and economic means have been provided for accomplishing all the objects and advantages of this invention. While there have been shown and described the fundamental novel features of this optical read head as applied to preferred embodiments and with reference to a particular environment, it will be apparent to those skilled in the art that variations may be made therein without departing from the spirit of the invention.

What is claimed is:

1. An optical read head comprising:

a faceted light transmitting means having a first facet closely spaced from a reflective surface, a second facet lying distant therefrom, and a third facet joining said first and second facets, said transmitting means possessing the optical characteristic of total reflection, a light energy source positioned more distant from said reflective surface than said first facet, a light energy transducer proximate to said second facet, said light energy source emitting light directly upon a portion of said reflective surface and upon said third facet, and light shielding means proximate to said reflective surface and said first facet isolating said reflective surface from light other than from said source, a representative portion of said light emitted directly upon said reflective surface reflecting therefrom and being coupled to said light energy transducer through said first and second facets according to the characteristic of total reflection.

2. An optical read head according to claim 1 including:

further light shielding means proximate to said light energy transducer and said second facet isolating said transducer from light energy other than that transmitted through said light transmitting means, and wherein said light transmitting means is a parallelepiped of substantially transparent matter.

3. An optical read head comprising the following combination of elements:

a source of light energy, a light transmitting medium, and a light energy transducing means, said elements all lying to one side of a reflective reference surface, said light transmitting medium being substantially transparent, having a geometrically regular shape, and having at least one pair of oppositely disposed facets, one facet of said pair of facets being oriented close to and facing said reference surface and having spaced edges, the other facet of said pair of facets lying distant from said surface and proximate to said light energy transducing means, said light transmitting medium receptive to light reflected from said reference surface and to said one facet to transmit to said other facet by internal reflection a representative quantum of said incident light, said light energy transducing means receptive to light emanating from said other facet to the substantial exclusion of all other light, a portion of said light transmitting medium convergent with said one facet and angularly displaced therefrom being partially interposed between said source of light energy and said reference surface and causing a segment of said reference surface which would otherwise be illuminated to lie in relative darkness, said light transmitting medium having a characteristic critical angle of reflection, said one facet and said portion of said transmitting medium, as oriented with respect to said reference surface, coactive with light from said source and defining one side of an interrogatable area of said reference surface, the interface between said illuminated and said relatively dark surface segments defining the opposite side of said interrogatable area.

4. An optical read head according to claim 3 wherein:

said light transmitting medium is in the form of a parallelepiped, said portion of said medium is a third facet lying between said one pair of facets, and said interrogatable area encompasses a surface smaller than the surface area encompassed by said one facet.

5. An optical read head according to claim 3 wherein:

said light transmitting medium is a rectangular parallelepiped of glass, and said sides of said interrogatable area are straight parallel lines having a distance therebetween less than the distance between said spaced edges of said one facet.

6. An optical read head according to claim 3 wherein:

said light transmitting medium comprises a plurality of adjacent rectangular parallelepipeds of substantially transparent material, and said light energy transducing means comprising a plurality of photoelectric cells each responsive to light energy received from a different one of said adjacent light transmitting parallelepipeds.

7. An optical read head according to claim 3 further including:

means supporting said elements in fixed relation to said reference surface, means shielding said light energy transducing means from light other than that emanating from said other facet, means shielding said reference surface from light other than that from said source of light energy, and means defining a channel between said source of light energy and said reference surface.

8. For an optical read head:

a plural faceted parallelepiped of light transmitting substance having the optical property of total reflection, said light transmitting substance being positioned to one side of a reference surface and having a first facet oriented proximate to and in generally facing relationship to said reference surface, said light transmitting substance having a second facet bordering said first facet and positioned generally orthogonal to said reference surface, energy means directing light at an acute angle both upon said second facet of said light transmitting substance and upon a portion of said side of said reference surface, said first and second facets, because of the property of total reflection, preventing the light directed upon said second facet from passing out from said first facet and onto said reference surface adjacent said portion of said reference surface and thereby defining one terminus of said surface portion.

9. The combination according to claim 8 further including:

a third facet of said transmitting substance positioned opposite from said first facet, and a light energy transducing means lying proximate to said third facet in facing relationship thereto, said first facet accepting an indicative quantum of said light directed upon and reflected from said surface portion, said quantum of light being totally reflected to said third facet and exiting therefrom to energize said light transducing means proportional to the amount of said reflected light.

10. The combination according to claim 9 wherein:

said transmitting substance is regularly subdivided into several units, said first, second, and third facets are common to each of said units and subdivide said surface portion similarly to said first facet, and said light energy transducing means is subdivided similarly to said third facet, said subdivisions of said light energy transducing means being individually energizable by light reflected from a respective one of each of said subdivisions of said surface portion.

11. An optical read head for an optical character recognition system in which media carrying visually discernable information having a reflective characteristic different than that of the media is transported along a path proximate to a light transmitting element comprising:

a compartmented body having an exterior surface forming one side of said path of said information bearing media, a source of light energy contained in a first of said compartments, a light channel formed in said body commencing at said first compartment and terminating at said exterior surface, said source of light energy emitting light into said light channel, the combination directing a generally rectangular beam of light toward said transport path, a light transmitting element in the form of a rectangular parallelepiped of substantially transparent matter received in a second compartment of said body, said transmitting element capable of transmitting light according to the phenomenon of total reflection and having a definable critical angle of reflection, said transmitting element lying in a plane generally perpendicular to said transport path and at an acute angle with said light channel, a first facet of said light transmitting element lying generally parallel to and slightly inset from said body surface, a second facet of said transmitting element intersecting said first facet along a line within said beam of light and casting a shadow onto said transport path dividing it into an illuminated portion and a contiguous shadowed portion, an interrogatable area of said transport path lying within said illuminated portion and having one terminus lying along the division between said illuminated and shadowed portions and within the geometric projection onto said transport path of the surface of said first facet, said interrogatable area having a second terminus opposite to said first terminus, parallel to the line of intersection of said first and second facets, and outside the geometric projection of said first facet upon said transport path, a third facet of said transmitting element lying opposite to said first facet and distant from said transport path, light directed from said source upon said interrogatable area being reflected therefrom to said first facet and, in accordance with the phenomenon of total reflection, being accepted into said light transmitting element through said first facet and being transmitted to and through said third facet, the quantum of light so transmitted being indicatively proportional to the quantum of light reflection from said interrogatable area, and a light energy transducing member contained in a third compartment of said body, said transducing member oriented adjacent said third facet and energizable by the light passing from said third facet to the substantial exclusion of all other light, the energy transduced by said member being indicative of information borne on said transported media.

12. In an optical read head positioned proximate to a reflective reference surface:

means directing illumination at an acute angle upon a first discrete area of said reference surface, and transmitting means receptive to illumination reflected from a second discrete area of said reference surface, said transmitting means having two opposite ends one of which is proximate to and facing said reference surface, and also having determinable optical characteristics, each of said discrete areas having two lateral termini, one of said termini of each of said discrete areas being distant from both the termini of the other discrete area and lying external the other discrete areas, the other of said termini of each of said discrete areas being proximate to each other and lying between the termini of the other discrete area and forming therebetween a coincident interrogatable area of said reference surface the other of the lateral termini of said second discrete area being defined by said optical characteristics of said transmitting means and its proximity to said reference surface, a portion of said transmitting means being positioned close to said interrogatable area and being interposed between said illuminating means and a segment of said second discrete area of said reference surface, said other terminus of said first discrete area being defined by the interposed portion of said transmitting means, its proximity to said reference surface, and the acute angle of said illumination upon said reference surface, illumination reflecting from said interrogatable area being totally reflected within said transmitting means from said one end thereof to said opposite end thereof, the transmitted illumination emanating from said opposite end having an intensity which is indicative of the reflective nature of that portion of the reference surface defined by the interrogatable area.

13. In an optical read head which transmits light reflected from a reference surface and transduces the energy of the transmitted light into an electrical output indicative of the quantum of reflected light, a light energy transducer, a plural faceted light transmitting medium positioned between and optically coupling said reference surface to said transducer, a first facet of said medium facing said reference surface and lying at a slight distance therefrom, a second facet of said medium lying distant from said first facet and facing said transducer, a third facet of said medium lying between and uniting said first and second facets, the union of said first and third facets forming a corner proximate said reference surface, and a source of light energy directing light against said reference surface and said third facet adjacent said corner, said reference surface receiving light exclusively from said source, said first and third facets precluding the light directed against said third facet which is transmitted into said light transmitting medium from being thereafter directed upon said reference surface and limiting the area of the reference surface which receives light energy and from which light can be reflected toward said first facet.

14. In an optical read head which transmits an indicative quantum of light from a reference surface:

a plural faceted and unitary light transmitting medium lying to one side of said reference surface, said light transmitting medium having one of its facets closely spaced from said reference surface and another of its facets generally orthogonal to said one facet, a source of light also lying to said one side of said reference surface and emitting a contiguous band of light directly and at an acute angle upon said reference surface and said other facet adjacent said reference surface, the light upon said reference surface encompassing an area having limits which are definable in part by the position of said facets relative to said reference surface, an indicative quantum of the light upon said reference surface from said source reflecting upon said one facet and being transmitted through said light transmitting medium.

15. For an optical character recognition system, means defining upon a reflective reference surface a small area of illumination comprising:

a source of illumination directing toward said reference surface at an acute angle a relatively wide beam of illumination, and a plural faceted light transmitting medium characterized by the ability to respond to illumination incident thereon in accordance with the phenomenon of total reflection, one facet of said medium positioned at an acute angle to said beam of illumination and within a portion thereof to intercept said portion, said one facet having one edge lying substantially perpendicular to and closely spaced from said reference surface, and another facet of said medium positioned close to and facing said reference surface and having an edge common to said one edge of said one facet.

References Cited by the Examiner

UNITED STATES PATENTS

| | | | |
|---|---|---|---|
| 2,725,786 | 12/1955 | McCarthy | 88—1 |
| 3,249,692 | 5/1966 | Clay et al. | 88—1 |
| 3,249,758 | 5/1966 | De Luca et al. | 88—1 |

RALPH G. NILSON, *Primary Examiner.*

M. ABRAMSON, *Assistant Examiner.*